US008610423B2

(12) United States Patent
Al-Dahle et al.

(10) Patent No.: US 8,610,423 B2
(45) Date of Patent: Dec. 17, 2013

(54) LOW NOISE EXTERNAL ENABLE SWITCHER CONTROL SIGNAL USING ON-CHIP SWITCHER

(75) Inventors: Ahmad Al-Dahle, Santa Clara, CA (US); John Ching Yu Tam, Los Gatos, CA (US); Hugo Fiennes, Palo Alto, CA (US); Wei H. Yao, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/451,358

(22) Filed: Apr. 19, 2012

(65) Prior Publication Data

US 2012/0319666 A1 Dec. 20, 2012

Related U.S. Application Data

(62) Division of application No. 12/410,216, filed on Mar. 24, 2009, now abandoned.

(60) Provisional application No. 61/194,772, filed on Sep. 30, 2008.

(51) Int. Cl.
*H02M 3/156* (2006.01)

(52) U.S. Cl.
USPC ............................ 323/351; 345/211; 323/222

(58) Field of Classification Search
USPC .......... 345/211; 323/318, 349–351, 904, 222; 363/147, 144, 178
See application file for complete search history.

(56) References Cited

U.S. PATENT DOCUMENTS

| | | | | |
|---|---|---|---|---|
| 6,064,158 | A | 5/2000 | Kishita et al. | |
| 6,450,958 | B1 * | 9/2002 | Linkhart et al. | 600/437 |
| 6,825,641 | B2 | 11/2004 | Pigott | |
| 7,038,654 | B2 | 5/2006 | Naiki et al. | |
| 7,076,670 | B1 | 7/2006 | Krause et al. | |
| 7,292,462 | B2 | 11/2007 | Watanabe et al. | |
| 7,868,972 | B2 * | 1/2011 | Choi et al. | 349/68 |
| 2004/0225821 | A1 * | 11/2004 | Klein et al. | 710/306 |
| 2007/0008745 | A1 * | 1/2007 | Joshi et al. | 363/21.01 |

* cited by examiner

*Primary Examiner* — Harry Behm
(74) *Attorney, Agent, or Firm* — Fletcher Yoder PC

(57) ABSTRACT

A method and system is disclosed for powering device sub-circuitry of an electronic device. The sub-circuitry may be used to provide control signals to a direct current switcher on a main system board, thus eliminating passive circuitry typically associated with the sub-circuitry. Furthermore, by actively generating the control signals for the direct current switcher, explicit timing control circuitry is not required to synchronize the transmitted power to the sub-circuitry.

22 Claims, 3 Drawing Sheets

LOW NOISE EXTERNAL ENABLE SWITCHER CONTROL SIGNAL USING ON-CHIP SWITCHER

CROSS REFERENCE TO RELATED APPLICATION

This application is a Divisional Application of U.S. patent application Ser. No. 12/410,216 filed Mar. 24, 2009 now abandoned and claims the benefit of U.S. Provisional Application No. 61/194,772, filed Sep. 30, 2008.

BACKGROUND

The present disclosure relates generally to off-chip control of an integrated circuit via a DC/DC switcher.

DESCRIPTION OF THE RELATED ART

This section is intended to introduce the reader to various aspects of art that may be related to various aspects that are described and/or claimed below. This discussion is believed to be helpful in providing the reader with background information to facilitate a better understanding of these various aspects. Accordingly, it should be understood that these statements are to be read in this light, and not as admissions of prior art.

Direct current to direct current (DC/DC) switchers, also known as DC/DC controllers or converters, are used in consumer electronics to convert voltage from one level to another. The need for this conversion may stem from sub-circuits in an electronic device requiring different voltages than that supplied by a battery or a power supply. By employing DC/DC switchers in an electronic device for converting the voltage from a fixed source, such as a battery or other power source, the electronic device may power multiple types of sub-circuits using only a single fixed source rather than requiring separate power sources for each sub-circuit.

One particular type of DC/DC switcher converts a first DC voltage level to a second DC voltage level by temporarily storing input energy and subsequently releasing that energy at a different voltage through the use of passive components such as an inductors or capacitors. However, utilization of these types of components can lead to electronic noise and electromagnetic interference of sub-circuits neighboring the DC/DC switcher. Furthermore, components such as inductors and capacitors increase the overall size of the DC/DC switcher, thus necessitating more space when integrating DC/DC switchers into electronic devices. Accordingly, as demand for smaller electronic devices continues grow, there is a need for smaller DC/DC switchers that may be used in an electronic device without causing interference with the operation of neighboring circuitry.

SUMMARY

Certain aspects of embodiments disclosed herein by way of example are summarized below. It should be understood that these aspects are presented merely to provide the reader with a brief summary of certain embodiments and that these aspects are not intended to limit the scope of the claims. Indeed, the disclosure and claims may encompass a variety of aspects that may not be set forth below.

An electronic device that includes a power management unit is described below. The power management unit may include a DC/DC converter (i.e. a DC/DC switcher) that may provide switched power to off board circuitry that would normally require its own DC/DC converter. The DC/DC converter of the power management unit may be treated as a slave unit in that it may be enabled and disabled by a master power controller associated with the off board circuitry via master power controller circuitry. In this manner, the off board circuitry may control the operation of the DC/DC converter, thereby controlling the power generated by the DC/DC converter and provided to the off board circuitry. Moreover, because the power management unit may generate the switched power based, in part, on a control signal from the master power controller, there may be no need to provide an additional timing signal to the off board circuitry. Accordingly, the passive circuitry, such as inductors and capacitors, typically used in conjunction with a power controller as part of a DC/DC converter in the off board circuitry for the generation of power may be removed. Through removal of the passive circuitry, the space utilized by the off board circuitry may be reduced. Additionally, the master power controller may emit less electronic noise and EMI than a DC/DC converter, due to the elimination of the capacitors and inductors, as well as the magnetic and electric fields caused by the switching currents on the off board circuitry. Accordingly, the master power controller may be placed in a closer proximity to other integrated circuits in the electronic device with a reduced risk of inductive crosstalk. These factors, when applied to a plurality of sub-circuits in an electronic device, may combine to allow for a reduction in overall size and ease of packaging of the electronic device.

BRIEF DESCRIPTION OF THE DRAWINGS

Certain embodiments may be understood reading the following detailed description and upon reference to the drawings in which like characters represent like parts throughout the drawings, wherein.

DETAILED DESCRIPTION OF SPECIFIC EMBODIMENTS

One or more specific embodiments will be described below. In an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques and circuitry for conversion and delivery of electrical power from internal circuitry in an electronic device to electronic sub-circuits of the electronic device. In one embodiment, a power management unit includes a DC/DC converter that may be used to accomplish regulation and conversion of voltage for transmission to sub-circuits of the electronic device that would normally include their own DC/DC converters. Rather, a sub-circuit is associated with a master power controller that treats the DC/DC converter of the power management unit as a slave DC/DC converter. By providing switched power to the sub-circuit, passive circuitry, such as inductors and capacitors, typically used in conjunction with the master power controller of the sub-circuit to form a DC/DC converter, may be removed from the sub-circuit. In this manner, the use of passive circuitry in the sub-circuit may be eliminated. Further, because the passive circuitry is confined to the power management unit, the passive circuitry that may otherwise induce inductive crosstalk with other electrical components can be shielded properly in a single location, rather than in multiple locations. Thus, the sub-circuits may be placed in closer proximity to one another with reduced potential for unwanted effects such as inductive crosstalk between the sub-circuits. Additionally, since the master power controller of the sub-circuit provides a control signal to the slave DC/DC converter, the need for independent timing circuitry for controlling the slave DC/DC converter is alleviated. A discussion is presented below of an electronic circuit that utilizes such circuitry.

Figure 1:
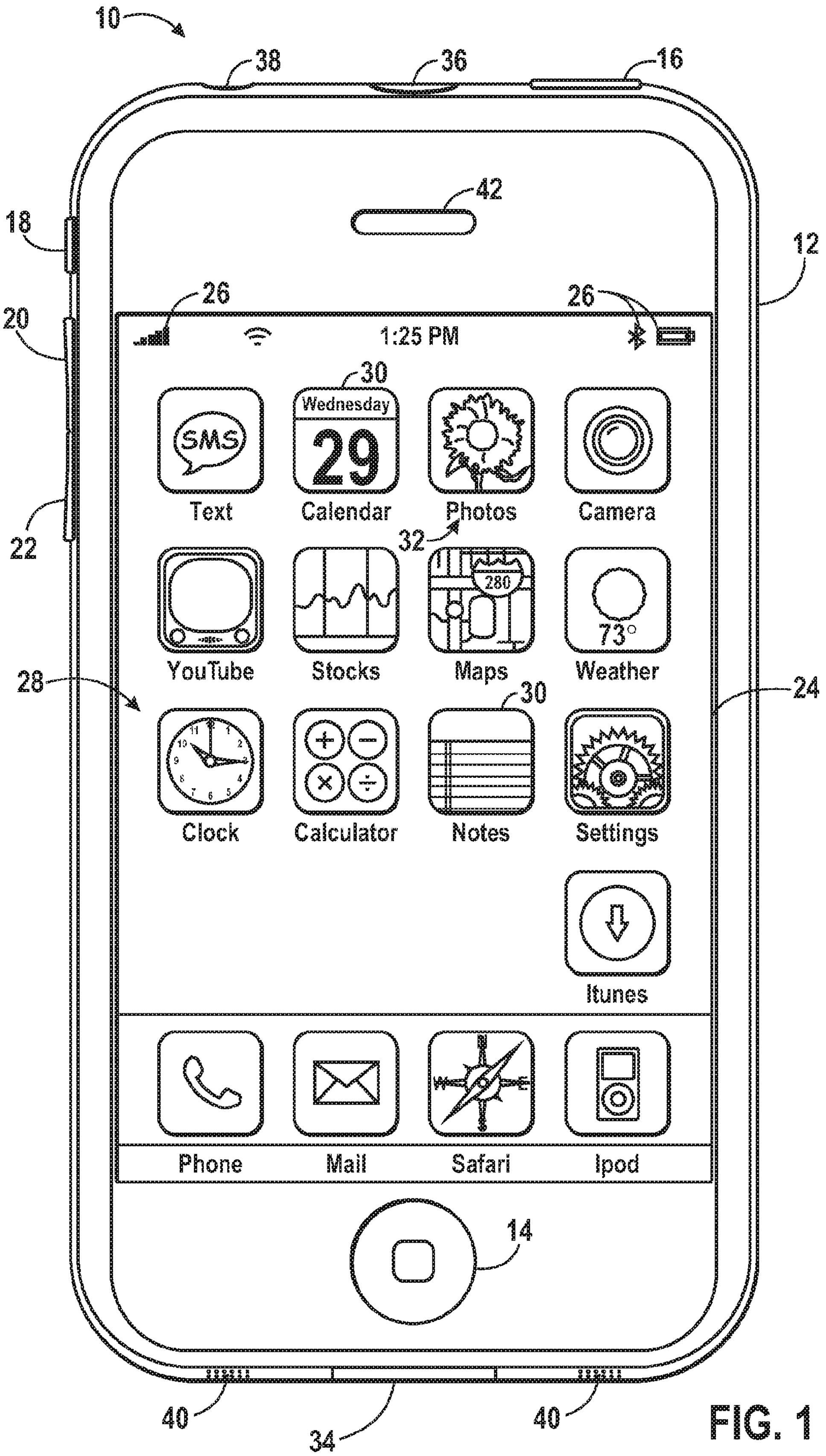
FIG. 1 is a front view of an electronic device, such as a portable media player, in accordance with one embodiment.

Turning now to the figures, FIG. 1 illustrates an electronic device 10 that may be a handheld device incorporating the functionality of one or more portable devices, such as a media player, a cellular phone, a personal data organizer, and so forth. Depending, of course, on the functionalities provided by the electronic device 10, a user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connections, such as Bluetooth and near field communication. By way of example, the electronic device 10 may be a model of an iPhone® available from Apple Inc. of Cupertino, Calif.

In the depicted embodiment, the device 10 includes an enclosure 12 that protects the interior components from physical damage and shields them from electromagnetic interference. The enclosure 12 may be formed from any suitable material such as plastic, metal, or a composite material and may allow certain frequencies of electromagnetic radiation to pass through to wireless communication circuitry within the device 10 to facilitate wireless communication.

The enclosure 12 allows access to user input structures 14, 16, 18, 20, and 22 through which a user may interface with the device. Each user input structure 14, 16, 18, 20, and 22 may be configured to control a device function when actuated. For example, the input structure 14 may include a button that when pressed causes a "home" screen or menu to be displayed on the device. The input structure 16 may include a button for toggling the device 10 between a sleep mode and a wake mode. The input structure 18 may include a two-position slider that silences a ringer for the cell phone application. The input structures 20 and 22 may include buttons for increasing and decreasing the volume output of the device 10. In general, the electronic device 10 may include any number of user input structures existing in various forms including buttons, switches, control pads, keys, knobs, scroll wheels, or other suitable forms.

The device 10 also includes a display 24 which may display various images generated by the device. For example, the display 24 may show photos, movies, album art, and/or data, such as text documents, spreadsheets, text messages, and email, among other things. The display 24 also may display system indicators 26 that provide feedback to a user, such as power status, signal strength, call status, external device connection, and the like. The display 24 may be any type of display such as a liquid crystal display (LCD), a light emitting diode (LED) display, an organic light emitting diode (OLED) display, or other suitable display. Additionally, the display 24 may include a touch-sensitive element, such as a touch screen.

The display 24 may be used to display a graphic user interface (GUI) 28 that allows a user to interact with the device. The GUI 28 may include various layers, windows, screens, templates, elements, or other components that may be displayed in all, or a portion, of the display 24. Generally, the GUI 28 may include graphical elements that represent applications and functions of the device 10. The graphical elements may include icons and other images representing buttons, sliders, menu bars, and the like. In certain embodiments, the user input structure 14 may be used to display a home screen of the GUI 28. For example, in response to actuation of the input structure 14, the device may display graphical elements, shown here as icons 30, of the GUI 28. The icons 30 may correspond to various applications of the device 10 that may open upon selection of an icon 30. The icons 30 may be selected via a touch screen included in the display 24, or may be selected by user input structures, such as a wheel or button.

The icons 30 may represent various layers, windows, screens, templates, elements, or other components that may be displayed in some or all of the areas of the display 24 upon selection by the user. Furthermore, selection of an icon 30 may lead to a hierarchical navigation process, such that selection of an icon 30 leads to a screen that includes one or more additional icons or other GUI elements. Textual indicators 32 may be displayed on or near the icons 30 to facilitate user interpretation of each icon 30. It should be appreciated that the GUI 30 may include various components arranged in hierarchical and/or non-hierarchical structures.

When an icon 30 is selected, the device 10 may be configured to open an application associated with that icon and display a corresponding screen. For example, when the Weather icon 30 is selected, the device 10 may be configured to open a weather application with a user interface that may provide the current weather conditions to a user. Indeed, for each icon 30, a corresponding application that may include various GUI elements may be opened and displayed on the display 24.

The electronic device 10 also may include various input and output (I/O) ports 34, 36, and 38 that allow connection of the device 10 to external devices. For example, the I/O port 34 may be a connection port for transmitting and receiving data files, such as media files. Furthermore, the I/O port 34 may be a proprietary port from Apple Inc. The I/O port 36 may be a connection slot for receiving a subscriber identify module (SIM) card. The I/O port 38 may be a headphone jack for connecting audio headphones. In other embodiments, the device 10 may include any number of I/O ports configured to connect to a variety of external devices, including but not limited to a power source, a printer, and a computer. In other embodiments, multiple ports may be included on a device. Additionally, the ports may be any interface type, such as a universal serial bus (USB) port, serial connection port, Firewire port, IEEE-1394 port, or AC/DC power connection port.

The electronic device 10 may also include various audio input and output structures 40 and 42. For example, the audio input structures 40 may include one or more microphones for receiving voice data from a user. The audio output structures 42 may include one or more speakers for outputting audio data, such as data received by the device 10 over a cellular network. Together, the audio input and output structures 40 and 42 may operate to provide telephone functionality. Further, in some embodiments, the audio input structures 40 may include one or more integrated speakers serving as audio output structures for audio data stored on the device 10. For example, the integrated speakers may be used to play music stored in the device 10. Additional details of the illustrative device 10 may be better understood through reference to FIG. 2, which is a block diagram illustrating various components and features of the device 10 in accordance with one embodiment of the present invention.

Figure 2:
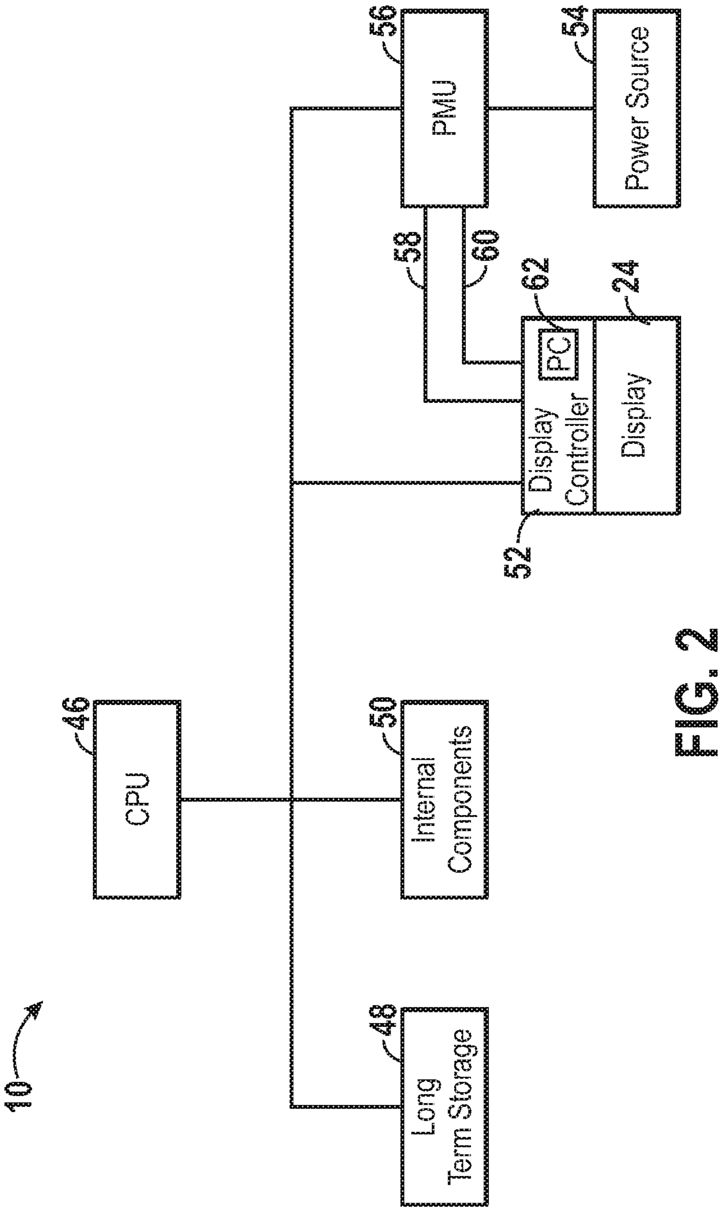
FIG. 2 is a block diagram of certain components of the electronic device of FIG. 1.

FIG. 2 is a block diagram that illustrates the components that may be utilized by the electronic device 10 to operate. In the presently illustrated embodiment, the device 10 includes the display 24 discussed above. In addition, as discussed in greater detail below, the electronic device 10 may include includes a central processing unit (CPU) 46, long-term storage 48, internal components 50, a display controller 52, a power source 54, and a power management unit (PMU) 56.

As set forth above, the electronic device 10 may include a CPU 46. The CPU 46 may include a single processor or it may include a plurality of processors. For example, The CPU 46 may also include one or more "general-purpose" microprocessors, a combination of general and special purpose microprocessors, and/or ASICS, as well as one or more reduced instruction set (RISC) processors, graphics processors, video processors, and/or related chip sets. The CPU 46 may provide the processing capability to execute the operating system, programs, the GUI 28, and any other functions of the device 10.

Accordingly, the electronic device 10 may include long term storage 48. The long-term storage 48 of electronic device 10 may be used for storing data utilized for the operation of the CPU 46 as well as other data required by the device 10. For example, the long term storage 48 may store the firmware for the electronic device 10 usable by the CPU 46, such as an operating system, other programs that enable various functions of the electronic device 10, user interface functions, and/or processor functions. Additionally, the long term storage 48 may store data files such as media (e.g., music and video files), image data, software, preference information (e.g., media playback preferences), wireless connection information (e.g., information that may enable the device 10 to establish a wireless connection, such as a telephone connection), subscription information (e.g., information that maintains a record of podcasts, television shows or other media to which a user subscribes), telephone information (e.g., telephone numbers), and any other suitable data. The long term storage 48 may be non-volatile memory such as read only memory, flash memory, a hard drive, or any other suitable optical, magnetic, or solid-state storage medium, as well as a combination thereof. Some of the data files stored by the long term storage 48 may be used by additional components of the device, which are designated as internal components 50.

The internal components 50 of electronic device 10 may include sub-circuits that perform specialized functions of the electronic device 10. These internal components 50 may include phone circuitry, camera circuitry, video circuitry, and audio circuitry. The phone circuitry may allow a user to receive or make a telephone call through user interaction with the audio input and output structures 40 and 42. The camera circuitry may allow a user to take digital photographs. Additionally, the video circuitry and the audio circuitry may be used to encode and decode video samples taken by the user in conjunction with the camera circuitry or downloaded from an external source such as the internet, and allow for the playing of audio files such as compressed music files, respectively. Moreover, while the display 24 and the display controller 52 and may also be considered a portion of the internal components 50, they have been illustrated separately to provide an example of the interaction of a given one of the sub-circuits with the power management unit (PMU) 56. The general operation of the display 24 and the display controller 52 will be described below, followed by a description of their interaction with the PMU 56. However, it should be noted that the PMU 56 may be used in a similar manner with any of the sub-circuits that make up the internal components 50.

As described above, the electronic device 10 may also include a display controller 52 that operates to generate images for the electronic device 10. The display controller 52 may be a device which, for example, receives image data from the video circuitry via the CPU 46. The display controller 52 may determine the pixel values used to create an image corresponding to the image data received and may generate voltage signals corresponding to those pixel values for display on the display 24. The pixel values may be numerical assignments that correspond to respective pixel intensities of the display 24 from which the display 24 may produce an image corresponding to the received voltage signals.

The electronic device 10 also includes a power source 54. The power source 54 may be used to power the electronic device 10 via, for example, one or more batteries, such as a Li-Ion battery, which may be user-removable or secured to the enclosure 12 and, which may be rechargeable. Additionally, the power source 54 may be connected to an I/O port that alternately allows for the power source 54 to receive power from an external AC or a DC power source, such as an electrical outlet or a car cigarette lighting mechanism.

The power source 54 may be coupled to the PMU 56 for translation of power from the power source 54 to power levels required by one or more sub-circuits of the electronic device 10. For ease of illustration, this discussion will focus on the PMU 56 providing power to the display controller 52, but it should be understood that the PMU 56 may provide power to any suitable sub-circuit of an electronic device. In this embodiment, the display 24 may include a display controller 52. The display controller 52 may include a master power controller 62. The PMU 56 includes a DC/DC converter, as described in detail below, that may be controlled by the master power controller 62 so that a DC voltage generated by the converter may be transmitted the display controller 52. The master power controller 62 may receive this power from the PMU 56 along the power line 58 as well as transmit control signals to the PMU 56 along the control line 60. In this manner, the PMU 56 may adjust the power transmitted to the display controller 52, as determined by the master power controller 62. For example, the power transmitted to the display controller 52 may be stepped up or stepped down, based on the requirements of the display controller 52, as determined by the master power controller 62. The PMU 56 may be on a different circuit board from the display controller 52. The PMU 56 may also monitor the power connections to an AC power source, as well as the charge of a battery, determine what power should be used to charge the battery, and/or control sleep and on/off functions for the electronic device 10.

Figure 3:
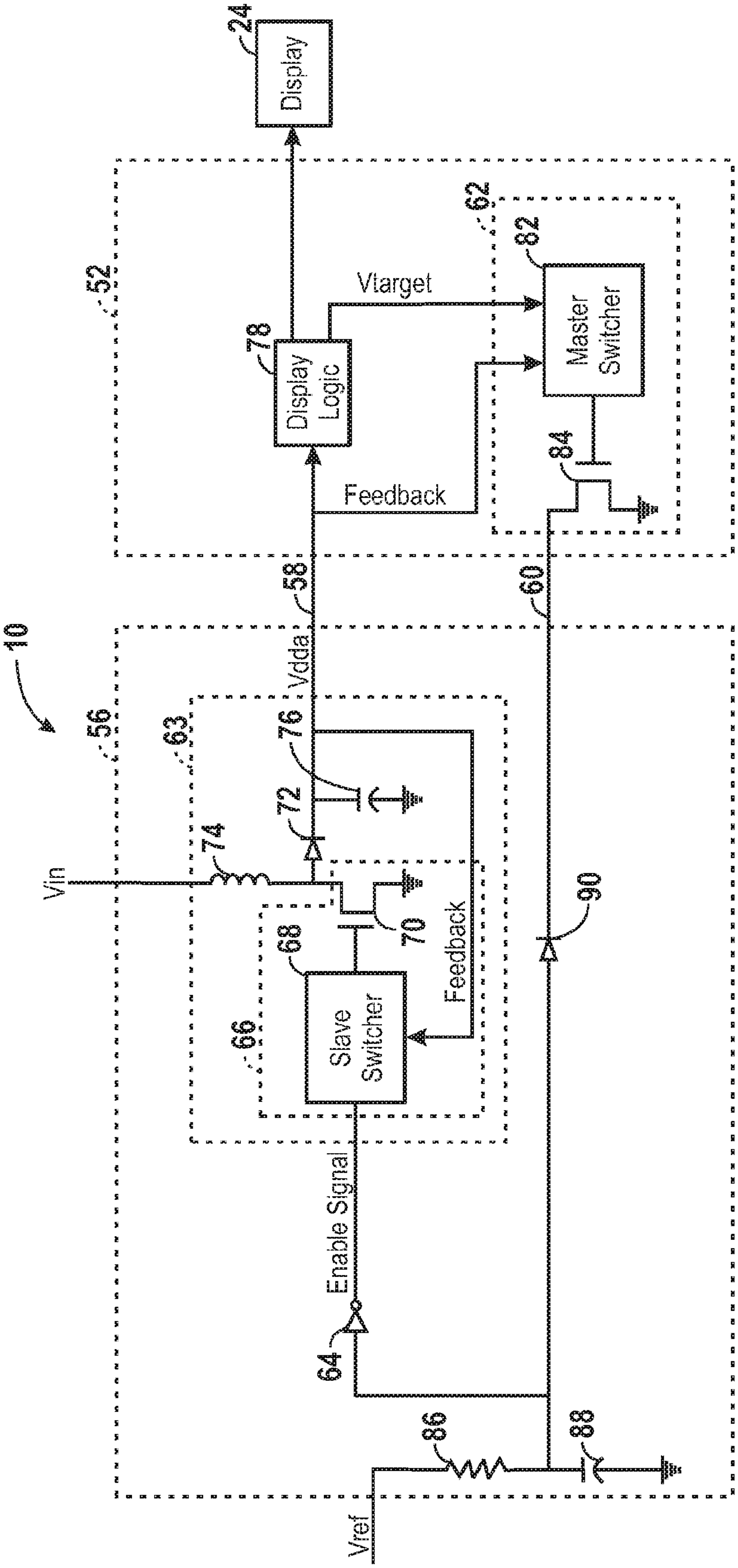
FIG. 3 is a simplified block diagram of the power delivery unit of FIG. 2 operating in conjunction with a controlled integrated circuit.

FIG. 3 illustrates a configuration of electronic device 10 whereby a sub-circuit, such as the display controller 52, receives an adjusted voltage $V_{dda}$ from the PMU 56. The generation of this adjusted voltage $V_{dda}$ may be controlled by the power controller 52, as described below.

The PMU 56 may include a DC/DC converter 63. This DC/DC converter 63 may generally be activated (enabled) by an activation signal from inverter 64. The DC/DC converter 63 may be utilized to convert voltage from one level to another. The DC/DC converter 63 may include a slave power controller 66 (including a slave switcher 68 and a slave switch 70), a diode 72, as well as passive circuitry such as inductor 74 and capacitor 76. In the embodiment illustrated in FIG. 3, the slave power controller 66, the diode 72, the inductor 74, and the capacitor 76 are in a configuration consistent with a step-up, or boost, DC/DC converter 63. However, the slave power controller 66, the diode 72, the inductor 74, and the capacitor 76 may alternatively be arranged into other power conversion configurations including a buck, a buck boost, and/or a fly-back configuration, based on the adjusted voltage $V_{dda}$ requirements of a controlling sub-circuit of the electronic device 10.

As noted above, the slave power converter 66 may include a slave switcher 68 and a slave switch 70. The slave switcher 68 starts or stops switching based on a comparison between a target voltage and the adjusted voltage $V_{dda}$ received by the slave switcher 68 via a feedback loop. In this manner, the slave power converter 66 regulates the adjusted voltage Vdda to a desired level. The slave switch 70 may be pulsed on and off to charge up an output capacitor 76. Indeed, the feedback voltage determines whether the slave switch 70, which may be a metal oxide semiconductor field effect transistor (MOSFET) that may operate as a switch, or any other suitable switch type, is to be pulsed or not pulsed.

As described above, the slave switch 70 may be activated and deactivated based on an output of the slave switcher 68, which, in turn, is controlled by an enable signal received from the inverter 64. As it switches, the slave switch 70 may alternately provide a path to ground for an input voltage $V_{in}$. For example, when the slave switch 70 is on, current is allowed to flow through the slave switch 70, providing a path to ground for the input voltage $V_{in}$ via the inductor 74. Conversely, when the slave switch is off, current is prevented from flowing through the slave switch 70, removing the path to ground for input voltage $V_{in}$. This input voltage $V_{in}$ may be a voltage supplied from, for example, the power source 54. For example, the input voltage $V_{in}$ may be a high rail voltage from an input voltage rail that may be 3.0 volts.

By regulating the amount of time that the path to ground is available for the input voltage $V_{in}$ to discharge, the value of the adjusted voltage $V_{dda}$ may be controlled. While slave switch 70 is on, and the path to ground is active, energy may be stored in the inductor 74 as part of a charging phase. Additionally, diode 72 prevents discharge the capacitor 76 to ground. Accordingly, the adjusted voltage $V_{dda}$ may be equal to the voltage as it discharged from the capacitor 76. As the capacitor 84 discharges, the adjusted voltage $V_{dda}$ may begin to drop in value. The value of the dropping adjusted voltage $V_{dda}$ may be transmitted to the slave switcher 68 via a feedback loop.

The value of the adjusted voltage $V_{dda}$ received via the feedback loop may be compared to a target voltage level required by the display controller 52. This target level may be, for example, 5.8 volts. As the adjusted voltage $V_{dda}$ falls below the target level required by the display controller 52, the slave switcher 68 may cease to provide an activation signal to the slave switch 70, thus turning the slave switch 70 off and removing the path to ground for input voltage $V_{in}$. While slave switch 70 is off, and the path to ground is disabled, energy may be released from the inductor 74 as part of a discharge phase. Since the path to ground is disabled, the energy released from the inductor 74 is transmitted to the display controller 52. As the energy is released, voltage may be provided to the capacitor 76 to charge the capacitor 76. Additionally, the adjusted voltage $V_{dda}$ transmitted across power line 58 to the display controller 52 may increase. This increase of the adjusted voltage $V_{dda}$ may be monitored by the slave switcher 68 via a feedback loop. The adjusted voltage $V_{dda}$ may be compared to the target voltage in the slave switcher 68. Once the adjusted voltage $V_{dda}$ reaches the target voltage, the slave switcher 68 may provide an activation signal to the slave switch 70, causing the charging phase to begin again.

In this manner, the DC/DC converter 63 operates to generate an adjusted voltage $V_{dda}$, which may be transmitted to the display controller 52 across power line 58. However, as described above, the DC/DC converter 63 is enabled and disabled (controlled) by an enable signal from inverter 64. Generation of this enable signal may be performed in the display controller 52, as described below.

The display controller 52 may include display logic 78 that may control the power requirements for the display 24. The power requirements may be expressed as a target voltage $V_{target}$. The display logic 78 may also transmit the target voltage $V_{target}$ to the master power controller 62, where it may be utilized as the voltage that the master power controller 62 may attempt to maintain, i.e. insure that the adjusted voltage $V_{dda}$ is maintained at the same level as the target voltage $V_{target}$. Thus, based on the target voltage $V_{target}$, the master power controller 62 may generate a control signal that may be used to generate an adjusted voltage $V_{dda}$ corresponding to the power requirements of the display 24.

The master power controller 62, may include a master switcher 82 and a master switch 84. The master power controller 62 may include similar components to those found in the slave power controller 66. Accordingly, the master switch 84 may perform as a switching device in conjunction with the master switcher 82. However, because the master power controller 80 is not connected to passive circuitry, such as inverters or capacitors, in the display controller 52, the master power controller may act as a control signal generator instead of a typical DC/DC controller. This may reduce the overall size of the display controller 52 due to the absence of the passive circuitry typically associated with the master power controller 62.

In generating the control signal, the master switcher 82 may act as a comparator for comparing the target voltage $V_{target}$ with the adjusted voltage $V_{dda}$, which may be received by the master switcher 82 as part of a feedback loop. The result of the comparison of the target voltage $V_{target}$ and the adjusted voltage $V_{dda}$ may be output in the form of a series of clock pulses. For example, when the adjusted voltage $V_{dda}$ is determined to be lower than the target voltage $V_{target}$, the master switcher 82 may begin switching, i.e. generating a series of clock pulses that may toggle the master switch 84 to generate the activation signal for the slave switcher 68.

In operation, the master switch 84 may toggle on and off at a rate determined by the output of the master switcher 82. The master switcher 82 may make this determination based, in part, on the voltage transmitted across power line 58 via a feedback loop. In this manner, the voltage transmitted across power line 58 acts both as a power line for the display 24 and as a feedback loop used by the master switcher 82 to determine the rate at which to toggle the master switch 84 on and off.

The toggling of the master switch 84 may activate and deactivate a control signal across control line 60 used to control internal circuitry of the PMU 56, thus insuring proper power (adjusted voltage $V_{dda}$) is transmitted to the display controller 52 across power line 58. Toggling the master switch 84 may provide and disable a discharge path to the capacitor 88 across the control line 60 and through the diode 90. The discharged capacitor 88 is equivalent to a low voltage which is then inverted, via the inverter 64, to enable the slave switcher 68. A suitable resistor 86 is chosen to limit the rise time of the RC circuit formed by the capacitor 88 and the resistor 86, thus limiting the bandwidth of the control signal to the slave switcher 68. The time constant of the RC circuit may be chosen to be longer than the period of the pulse from the master switcher 82 to filter out individual pulses so that the slave switcher 68 essentially sees on/off signals as an enable signal.

It should be noted that by utilizing the control signal as the basis for the enable signal of the slave switcher 68, the timing sequencing of the display controller 52, and specifically the master power controller 62, is maintained implicitly and without an explicit timing control signal. Accordingly, the display controller 52 may continue to function as if it included both a master power controller 62 as well as its own passive components, i.e. as if an unmodified internal DC/DC controller was present, rather than a master power controller 62 absent the passive components typically associated with a DC/DC converter.

In this manner, internal circuitry, such as PMU 56, may provide switched power to a sub-circuit, such as the display controller 52. The sub-circuit may include a master power controller 62 without passive circuitry typically associated with a DC/DC converter. Thus, instead of generating its own power on sub-circuit, the master power controller 62 may be utilized to generate a control signal that may control the generation of the switched power on the PMU.

Specific embodiments have been shown by way of example in the drawings and have been described in detail herein. However, it should be understood that the claims are not intended to be limited to the particular forms disclosed. Rather, the claims are to cover all modifications, equivalents, and alternatives falling within their spirit and scope.

What is claimed is:

1. An electronic device, comprising:

a first circuit board comprising a power management unit, the power management unit comprising a dc/dc converter, wherein the dc/dc converter comprises a slave power controller coupled to passive circuit components configured to convert a first dc voltage to a second dc voltage; and a second circuit board comprising a sub-circuit and a master power controller, the sub-circuit being configured to receive the second dc voltage, the master power controller being operably coupled to the slave power controller, wherein the master power controller is configured to generate a control signal to instruct the slave power controller to switch the first dc voltage relative to the passive circuit components to generate the second dc voltage, wherein the control signal is a power controller switcher activation control signal.

2. The electronic device of claim 1, wherein the slave power controller comprises a slave switcher coupled to a slave switch, and wherein the master power controller comprises a master switcher coupled to a master switch, the master switch being operably coupled to the slave switcher; and wherein the master switcher is operable to switch the master switch on and off to alternatively enable and disable the slave switcher to cause the slave switcher to switch the slave switch on and off to cause the first dc voltage to be switched relative to the passive circuit components to generate the second dc voltage.

3. The electronic device of claim 1, wherein the first circuit board is separate from the second circuit board.

4. The electronic device of claim 1, wherein the slave power controller is arranged relative to the passive components and an input for the first dc voltage to form one of a buck dc/dc voltage converter, a boost dc/dc voltage converter, or a flyback dc/dc voltage converter.

5. The electronic device of claim 1, wherein the sub-circuit comprises display logic.

6. The electronic device of claim 1, wherein the master power controller circuit controls the slave power controller based at least in part on the power requirements of the sub-circuit.

7. The electronic device of claim 6, wherein the master power controller receives from the sub-circuit a signal indicative of the power requirement of the sub-circuit and receives the second dc voltage as a feedback signal, and wherein the master power controller controls the slave power controller based at least in part on a comparison of the power requirement signal and the feedback signal.

8. The electronic device of claim 1, wherein the power management unit comprises filtering circuitry coupled between the master power controller and the slave power controller.

9. The electronic device of claim 1, wherein the power controller switcher activation control signal generated by the master controller comprises a series of clock pulses.

10. A handheld electronic device comprising:

a power management unit physically located on a first circuit board and comprising a dc/dc converter, wherein the dc/dc converter comprises a slave power controller coupled to passive circuit components configured to convert a first dc voltage to a second dc voltage;

a display configured to provide a user interface; and a display controller coupled to the display, wherein the display controller is physically located on a second circuit board, the display controller comprising a master power controller and a display logic circuit, the display logic circuit being configured to control the display and being configured to receive the second dc voltage, the master power controller being operably coupled to the slave power controller to cause the slave power controller to switch the first dc voltage relative to the passive circuit components to generate the second dc voltage based at least in part on power requirements of the display logic circuit, wherein the master power controller receives from the display logic circuit a signal indicative of the power requirement of the display logic circuit and receives the second dc voltage as a feedback signal.

11. The handheld electronic device of claim 10, wherein the slave power controller comprises a slave switcher coupled to a slave switch, and wherein the master power controller comprises a master switcher coupled to a master switch, the master switch being operably coupled to the slave switcher; and wherein the master switcher is operable to switch the master switch on and off to alternatively enable and disable the slave switcher to cause the slave switcher to switch the slave switch on and off to cause the first dc voltage to be switched relative to the passive circuit components to generate the second dc voltage.

12. The handheld electronic device of claim 10, wherein the power management unit is located separately from the display within the handheld electronic device.

13. The handheld electronic device of claim 10, wherein the slave power controller is arranged relative to the passive components and an input for the first dc voltage to form one of a buck dc/dc voltage converter, a boost dc/dc voltage converter, or a fly back dc/dc voltage converter.

14. The handheld electronic device of claim 10, wherein the master power controller controls the slave power controller based at least in part on a comparison of the power requirement signal and the feedback signal.

15. The handheld electronic device of claim 10, wherein the power management unit comprises filtering circuitry coupled between the master power controller and the slave power controller.

16. A method of providing power to a sub-circuit, comprising:

converting a first dc voltage to a second dc voltage using a slave dc/dc converter located on a first circuit board;

supplying the second dc voltage to a sub-circuit, the sub-circuit being operably coupled to a master power controller, wherein the sub-circuit and master power controller are located on a second circuit board;

generating a control signal on the master power controller; and transmitting the control signal from the master power controller to the slave dc/dc converter to instruct the slave dc/dc converter to convert the first dc voltage to the second dc voltage based at least in part on power requirements of the sub-circuit;

wherein the control signal is a power controller switcher activation control signal.

17. The method of claim 16, wherein converting the first dc voltage to the second dc voltage comprises switching the first dc voltage relative to passive circuit components in the slave dc/dc converter.

18. The method of claim 16, wherein generating the control signal comprises:

transmitting a signal indicative of the power requirements of the sub-circuit to the master power controller;

transmitting the second dc voltage as a feedback signal to the master power controller; and generating the control signal by the master power controller based at least in part on a comparison of the signal indicative of the power requirements of the sub-circuit and the feedback signal.

19. The method of claim 16, comprising filtering the control signal transmitted from the master power controller to the slave dc/dc converter.

20. The method of claim 16, wherein transmitting the control signal comprises enabling and disabling the slave dc/dc converter to cause the slave dc/dc converter to cause the first dc voltage to be switched relative to passive components of the slave dc/dc converter.

21. The method of claim 16, wherein converting the first dc voltage to the second dc voltage comprises adjusting the first dc voltage upwardly or downwardly.

22. The method of claim 16, wherein the power controller switcher activation control signal generated on the master power controller comprises a series of clock pulses.

* * * * *